United States Patent [19]

El-Habr

[11] 4,222,300
[45] Sep. 16, 1980

[54] GLASS SCORING APPARATUS
[76] Inventor: Michel E. El-Habr, 3930 W. Vickery, Fort Worth, Tex.
[21] Appl. No.: 28,125
[22] Filed: Apr. 9, 1979
[51] Int. Cl.³ .............................................. B26D 3/08
[52] U.S. Cl. ...................................... 83/886; 83/564; 33/32 E
[58] Field of Search ................................ 83/879–886, 83/564; 33/32 E

[56] References Cited
U.S. PATENT DOCUMENTS

| | | | |
|---|---|---|---|
| 1,807,619 | 6/1931 | Boush | 33/32 E |
| 2,078,386 | 4/1937 | Kendis | 33/32 E |
| 4,120,220 | 1/1977 | Mullen | 83/886 |

Primary Examiner—J. M. Meister
Attorney, Agent, or Firm—James E. Bradley

[57] ABSTRACT

A glass scoring apparatus having a frame with upper and lower arms extending outward. A resilient roller is mounted to the lower arm and a scoring tool is carried by the upper arm. The roller is rotated by hand to advance the glass between the roller and the scoring tool. The scoring tool is secured to a vertical shaft and carried by the upper arm. A lever arm is connected to the shaft above the upper arm. A fulcrum is located on the upper arm for contact by the lever arm to raise and lower the shaft. A spring applies downward force on the shaft.

8 Claims, 2 Drawing Figures

GLASS SCORING APPARATUS

BACKGROUND OF THE INVENTION

1. Field of the Invention

This invention relates in general to glass cutting devices, and in particular to an apparatus for scoring sheet glass.

2. Description of the Prior Art

For making stained glass windows, lampshades, and the like, flat glass is cut into irregular shapes. Small shops and hobbyists often use handheld devices that are difficult to operate.

There are various proposals in the patented art for glass cutting machinery, such as U.S. Pat. Nos. 4,027,562; 3,280,677; and 2,515,455. The latter two patents deal with high speed power driven machines. The first patent requires an air cylinder and more complexity than feasible for an inexpensive device.

SUMMARY OF THE INVENTION

It is accordingly a general object of this invention to provide an improved apparatus for scoring glass that is simple in construction.

It is a further object to provide an improved apparatus for scoring glass that is simple in construction and allows the force exerted from the cutting tool to be selectively varied.

It is a further object to provide an improved apparatus for scoring glass that is simple in construction and allows the scoring tool to be quickly moved upward to remove and insert glass.

In accordance with these objects, an apparatus is provided that has a frame with two horizontal arms spaced apart. An upper roller is mounted to the lower arm for advancing the glass. The scoring tool is carried by the upper arm. The scoring tool is secured to the end of a vertical shaft that extends slidably through the upper arm. A lever arm is mounted to the shaft. A fulcrum on the upper surface of the upper arm is contacted by the lever arm. Depressing the lever arm raises the shaft. The shaft is spring biased downward by a helical spring below the upper arm. The tension is adjusted through a threaded nut above the upper arm that incrementally raises and lowers the shaft.

DESCRIPTION OF THE PREFERRED EMBODIMENT

Figures 1, 2:
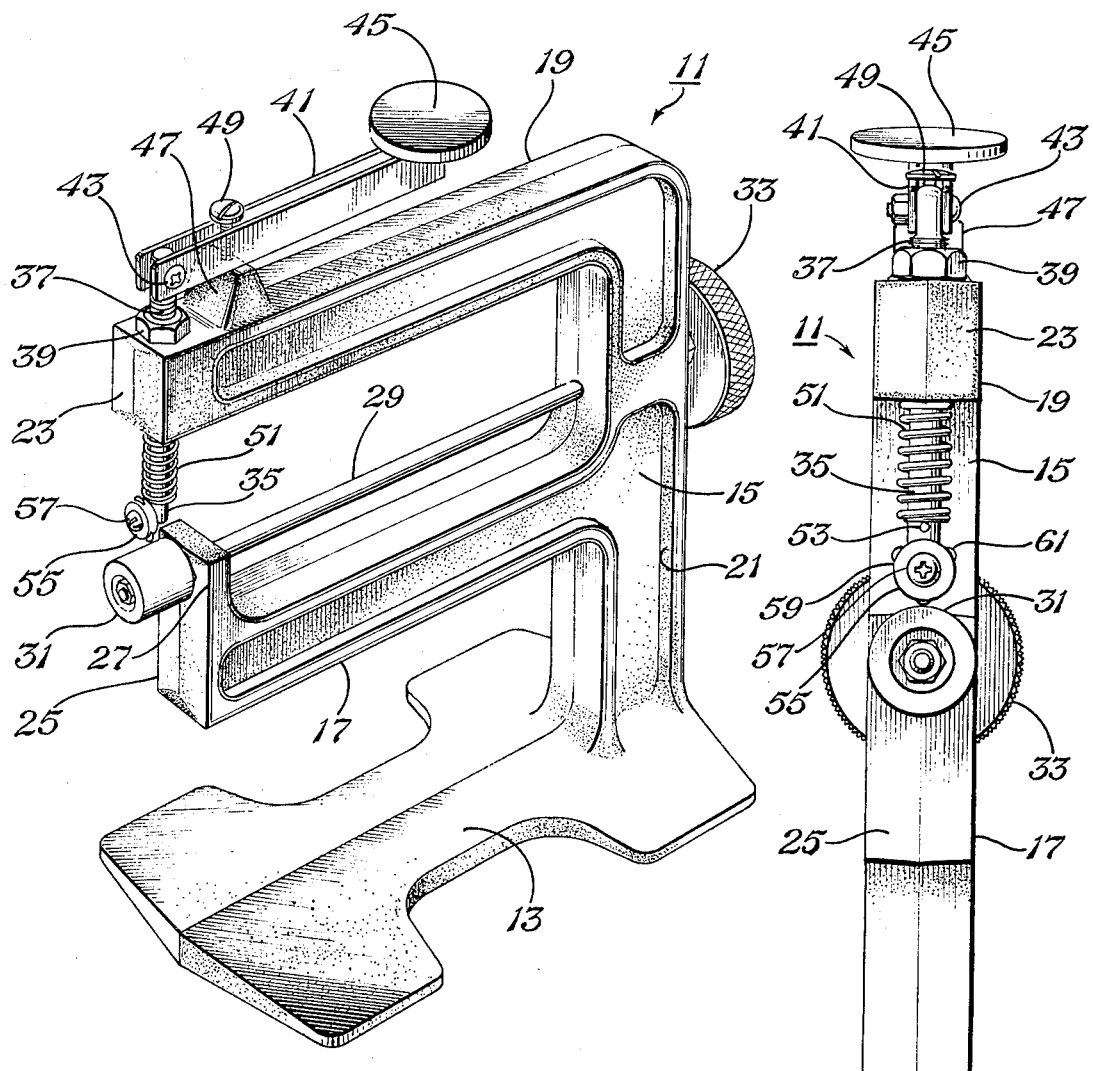
FIG. 1 is a perspective view of a glass scoring device constructed in accordance with this invention.
FIG. 2 is an end elevational view of the device of FIG. 1.

Referring to FIG. 1, the glass scoring device 11 includes a cast metal frame with a base 13, a vertical member 15 on one side, and two horizontal arms 17 and 19 all integrally formed together. Base 13 has a flat bottom for resting on a table, and is of width and length for stably supporting the vertical member 15 and arms 17 and 19. Vertical member 15 and arms 17 and 19 are essentially rectangular beams with recessed portions 21 to lighten their weight. Vertical member 15 is on the extreme right side of base 13, as shown in the drawing, and is perpendicular to base 13. The directions "horizontal" and "vertical" refer to the directions in which the device will be normally in use, and in which it is shown in the drawings.

Upper arm 19 is cantilevered from the top of vertical member 15, and has a free end 23 laterally disposed from vertical member 15. Lower arm 17 is cantilevered from vertical member 15 approximately midway between base 13 and upper arm 19. Lower arm 17 has a free end 25 laterally disposed from vertical member 15. The longitudinal axes of upper arm 19 and lower arm 17 are horizontal, parallel with each other, and perpendicular to vertical member 15. Lower arm 17 has a vertical flange 27 on its free end 25 that extends upwardly for a distance approximately equal to the height of lower arm 17. A cylindrical rod extends through an aperture in flange 27 and through an aperture in vertical member 15. These apertures are slightly larger in diameter than rod 29, allowing rod 29 to be rotated with respect to frame 11. Rod 29 is parallel with the longitudinal axes of the upper and lower arms 19 and 17.

A resilient or rubber roller 31 is mounted to rod 29 on the end that extends through flange 27 for rotation therewith. Roller 31 is cylindrical and has a slight clearance located between it and free end 25. A knurled knob 33 is mounted to the other end of rod 29 for rotation therewith. Knurled knob 33 is located on the right side of vertical member 15, as shown in the drawing. A clearance is provided between knob 33 and vertical member 15 to allow the user to grasp the knob with his fingers to rotate roller 31.

A cylindrical shaft 35 extends through an aperture in upper arm 19. The aperture is larger in diameter than shaft 35, allowing the shaft to reciprocate vertically. Shaft 35 is perpendicular to the longitudinal axes of arm 17 and 19. Threads 37 are located on the upper end of shaft 35, above upper arm 19. A nut 39 threadingly engages threads 37 and bears against the upper surface of upper arm 19.

A lever arm 41 has one end pivotally connected to shaft 37 by a horizontal pin or screw 43. Lever arm 41 comprises two parallel, metal strips secured together at their ends. Screw 43 extends through shaft 37 perpendicular to the shaft, and engages the two vertical strips of the lever arm 41. Screw 43 allows lever arm 41 to rotate a short distance in the same vertical plane that the longitudinal axes of arm 17 and 19 are located. Lever arm 41 extends above the top of arm 19 toward the vertical member 15. A circular pad 45 is secured to the free end of lever arm 41, and holds the two strips of the lever arm together at the end.

A fulcrum 47 is integrally formed with upper arm 19 on the upper surface. Fulcrum 47 is a triangular protrusion adapted to be contacted by lever arm 41. A screw 49 extends upwardly from the fulcrum 47 between the two strips of lever arm 41 to retain the lever arm to the fulcrum. The head of screw 49 is spaced slightly above lever arm 41 so as to not prevent pivoting of the lever arm 41 with respect to fulcrum 47. Fulcrum 47 is located from shaft 35 about 1/5 the total length of arm 41.

A helical spring 51 is compressed between the underside of upper arm 19 and a stop member or pin 53 in shaft 35. Spring 51 encircles shaft 35 and urges it downward. A scoring wheel or tool 55 is secured to the side of shaft 35 at its lower end by a screw 57. Scoring tool 55 is of a conventional type, comprising a circular disc 59 with three small wheels or rowels 61 spaced around the periphery of disc 59. Rowels 61 are spaced 90 degrees apart. When one becomes dull, screw 57 is loosened to rotate another in place.

The lengths of arms 17 and 19 are selected to allow a portion of the glass to extend into the area between the arm while cutting. The free end 23 of arm 19 terminates slightly past the free end 25 of lower arm 17 so as to position scoring tool 55 above rubber roller 31. In the preferred embodiment, cutting tool 55 is located about 7½ inches from the inside edge of vertical member 15.

In operation, the user pushes downward on pad 45 of lever 41, thereby raising shaft 35 and scoring tool 55 from contact with rubber roller 31. A sheet of glass (not shown) is inserted between scoring tool 55 and rubber roller 31. Lever arm 41 is released, allowing the cutting tool 55 to contact the glass. Compression of spring 51 provides sufficient force to cause the tool 55 to score the glass. The user rotates knob 33 by hand, thereby rotating roller 31 and advancing the glass. By listening, the user can determine if sufficient scoring depth is being achieved. If not, nut 39 is rotated counterclockwise. This allows spring 51 to move shaft 35 further downward, exerting more force. If less depth is required, nut 39 is rotated clockwise, further compressing spring 51 and incrementally raising shaft 35. Lever arm 41 can be depressed at pad 45 to remove the load on nut 39 so that it can be easily rotated for adjusting the tension. Once scored, lever 41 is again depressed at pad 45 to remove the glass. The glass can be broken along the score mark in a known manner.

It should be apparent that an invention having significant improvements has been provided. The scoring apparatus is simple in construction. Tension can be easily varied, and the glass can be easily removed and inserted simply by depressing the lever.

While the invention has been shown in only one of its forms, it should be apparent to those skilled in the art that it is not so limited but is susceptible to various changes and modifications without departing from the spirit thereof.

I claim:

1. An apparatus for scoring glass, comprising:
   a frame having a vertical member and upper and lower arms laterally disposed from their vertical member; the upper and lower arms having ends terminating a selected distance from the vertical member;
   a resilient roller rotatably mounted to the end of the lower arm;
   rotating means mounted to the frame for rotating the roller;
   a shaft carried vertically and slidably by the upper arm adjacent its end;
   a lever arm pivotally connected to the shaft above the upper arm and having a free end, the upper arm having a fulcrum on its upper surface contacted by the lever arm immediate its ends;
   a scoring tool mounted to the shaft below the upper arm and positioned above roller; and
   spring means carried by the frame for urging the shaft downward;
   whereby pressing downward on the free end of the lever arm raises the shaft to provide access for placing glass between the roller and the scoring wheel for scoring.

2. The apparatus according to claim 1 wherein the rotating means comprises a rod to which the roller is mounted for rotation therewith, the rod extending horizontally from the roller and rotatably through the vertical member of the frame; and
   a knob secured to the end of the rod opposite the roller for rotating the rod by hand.

3. The apparatus according to claim 1 wherein the spring means comprises a helical spring encircling the shaft between the upper arm and a stop on the shaft below the upper arm.

4. The apparatus according to claim 1 further comprising adjusting means carried by the frame for selectively varying the downward force imposed on the glass by the spring means.

5. The apparatus according to claim 4 wherein the adjusting means comprises a nut threadably secured to the shaft above the arm so that rotating the nut in one direction raises the shaft and rotating the nut in the other direction allows the shaft to move further downward.

6. The apparatus according to claim 1 wherein the upper and lower arms are horizontally disposed with their longitudinal axes parallel with each other.

7. The apparatus according to claim 1 wherein the free end of the lever arm is closer to the vertical member than the end of the lever arm that is connected to the shaft.

8. An apparatus for scoring glass, comprising:
   a frame having a vertical member and upper and lower arms laterally disposed from the vertical member, the upper and lower arms having free ends terminating a selected distance from the vertical member and vertically spaced apart;
   a rod rotatably extending through the vertical member and the lower arm;
   a resilient roller mounted to the rod at the free end of the lower arm for rotation therewith;
   means mounted to the other end of the rod for rotating the rod and the roller by hand;
   a shaft slidably and vertically extending through the upper arm adjacent its free end, the shaft having a threaded upper end;
   a nut threadably secured to the threads of the shaft so that rotating the nut in one direction raises the shaft and rotating the nut in the other direction allows the shafts to be lowered;
   a lever arm having one end pivotally connected to the shaft above the upper arm, with a free end disposed toward the vertical member, the upper arm having a fulcrum formed thereon that is contacted by the lever arm intermediate its ends;
   a scoring tool mounted to the shaft below the upper arm and positioned above the roller; and
   a helical spring encircling the shaft between the upper arm and a stop on the shaft below the upper arm, for urging the shaft downward;
   whereby pressing downward on the free end of the lever arm raises the shaft to provide access for placing glass between the roller and the scoring tool for scoring.

* * * * *